United States Patent [19]

Balsley

[11] 4,081,436
[45] Mar. 28, 1978

[54] PROCESS FOR DRY QUATERNIZATION OF AZO COMPOUNDS

[75] Inventor: Richard Benjamin Balsley, Lebanon, N.J.

[73] Assignee: American Cyanamid Company, Stamford, Conn.

[21] Appl. No.: 724,509

[22] Filed: Sep. 20, 1976

[51] Int. Cl.$^2$ ............................................. C09B 43/00
[52] U.S. Cl. ................................ 260/156; 260/158; 260/205; 260/208; 260/567.6 M
[58] Field of Search .......... 260/156, 158, 205, 146 R, 260/148, 208, 567.6 M

[56] References Cited

U.S. PATENT DOCUMENTS

| | | | |
|---|---|---|---|
| 2,480,355 | 8/1949 | Charpentier | 260/243 A |
| 2,650,251 | 8/1953 | Sprague | 260/567.6 M |
| 2,933,530 | 4/1960 | Kralt et al. | 260/567.6 M |
| 3,102,839 | 9/1963 | Neracher et al. | 260/567.6 M |
| 3,234,208 | 2/1966 | Liechti | 260/193 |
| 3,312,681 | 4/1967 | Lewis | 260/156 |
| 3,346,585 | 10/1967 | Dehnert | 260/157 X |
| 3,401,158 | 9/1968 | Fisher et al. | 260/158 |
| 3,956,271 | 5/1976 | Blass et al. | 260/205 X |

FOREIGN PATENT DOCUMENTS

| | | | |
|---|---|---|---|
| 556,218 | 4/1958 | Canada | 260/158 |

*Primary Examiner*—Charles F. Warren
*Attorney, Agent, or Firm*—John L. Sullivan

[57] ABSTRACT

Certain solid dye bases which are precursors of acrylic fiber dyes and which contain a tertiary nitrogen atom are effectively quaternized in high yield and purity in a "dry state" quaternization process comprising contacting the dye base with an essentially stoichiometric amount of an alkylating agent at a temperature of 30°–90° C., said alkylating agent being added to said dye base gradually at a rate such that the reaction mixture is a free-flowing solid throughout the reaction.

8 Claims, No Drawings

PROCESS FOR DRY QUATERNIZATION OF AZO COMPOUNDS

This invention relates to a process for the preparation of salts or organic tertiary amines. More particularly, it relates to a process for the quaternization of organic tertiary amines with an alkylating agent. Still more particularly, it relates to the preparation of organic salts which are solids at ambient temperatures by quaternization of a tertiary amine with an alkylating agent in the absence of a solvent or a large excess of either reactant, hereafter referred to as "dry state" quaternization.

Quaternization reactions are common in the manufacture of useful chemical products, for example, in the manufacture of many important acrylic fiber dyes. Many acrylic dye intermediates contain a tertiary nitrogen atom and these intermediates are commonly quaternized with a variety of alkylating agents to produce useful acrylic dyes. Generally these quaternization reactions are conducted in solution in a suitable solvent and/or in the presence of a large excess of the alkylating agent where the alkylating agent is a liquid. In large scale manufacturing operations this procedure is time consuming and expensive, since the reaction product must be isolated from solution and the solvent or excess alkylating agent must be recovered. Production capacity could be significantly increased and the time and expense significantly reduced if the "dry state" quaternization reaction could be utilized effectively, thereby eliminating the need for solvents, excess alkylating agents and the problems in handling resulting therefrom. Heretofore, such "dry state" quaternization reactions were thought to be impractical because it was believed that the reaction would be slow and incomplete, leading to heterogeneous reaction products which would have to be purified by recrystallization.

Surprisingly, however, in accordance with the present invention, it has been found that certain dye bases (I), (II), and (III):

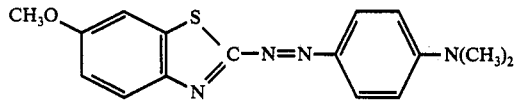

2-(p-dimethylaminophenylazo)-6-methoxybenzotriazole

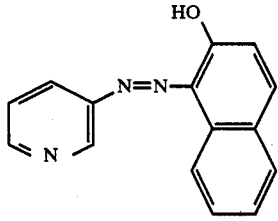

1-(3-pyridylazo)-2-naphthol

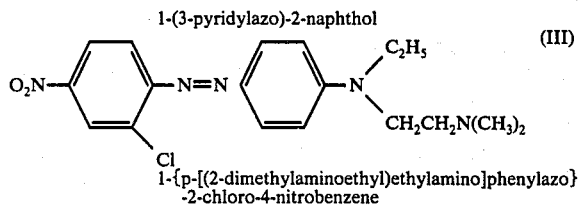

1-{p-[(2-dimethylaminoethyl)ethylamino]phenylazo}-2-chloro-4-nitrobenzene which are precursors of important acrylic fiber dyes and which contain a tertiary nitrogen atom, are effectively quaternized in high yield and purity in a "dry state" quaternization process, described hereinbelow, to provide the corresponding N-methyl quaternary salts thereof. The dye products obtained are essentially pure (greater than 95% purity) and may be used without further purification.

It will be appreciated that the "dry state" quaternization reaction of the present invention is clearly distinguished from previous methods of quaternization known heretofore. The "dry state" quaternization reaction may be characterized as "asolvent stoichiometric", i.e. stoichiometric amounts of dye base and alkylating agent in the absence of solvent, whereas previously used methods are (1) "solvent stoichiometric", that is, stoichiometric amounts of reactants in the presence of a solvent, (2) "solvent astoichiometric", that is, an excess of alkylating agent in the presence of a solvent, or (3) "asolvent astoichiometric", that is, an excess of alkylating agent in the absence of solvent. In the latter case, a large excess of alkylating agent is generally used.

Generally speaking the reactivity of a tertiary nitrogen atom in an aliphatic chain is much greater than a tertiary nitrogen atom in a heterocyclic ring, which in turn is much greater than a tertiary nitrogen atom of an aromatic amine. In the present invention compounds (I) and (II) contain heterocyclic tertiary nitrogen atoms and compound (I) also contains an aromatic tertiary nitrogen atom. The hetero nitrogen atoms of both (I) and (II) are sufficiently basic to displace the anion of the alkylating agent at a temperature below the decomposition point of either the reactants or the quaternary salt product. The aromatic tertiary nitrogen atom of (I), being less reactive, is untouched. Compound (III) in which the tertiary nitrogen atom is in an aliphatic chain is much more reactive.

In accordance with the process of the invention a solid dye base, in particular either of compounds (I), (II), or (III), is contacted at a temperature in the range of about 30° C to about 90° C with an essentially stoichiometric quantity of a suitable alkylating agent in a manner such that the reaction mixture is at all times a free-flowing solid. Thus, the solid dye base is stirred, agitated, tumbled, etc. at a desirable temperature as the alkylating agent, which may be a solid, liquid or gas, preferably a liquid and still more preferably a liquid methylating agent, is added thereto portion wise so that the reaction mixture thus formed remains a free-flowing solid. The alkylating agent is added portion wise such that the reaction rate is faster than the rate of addition. Stated another way, the quaternization reaction is exothermic and the alkylating agent is added at a rate such that the reaction temperature is readily controlled. In so doing there is never an excess of the alkylating agent during the quaternization reaction. If the alkylating agent is added all at once the reaction rate, and thus the temperature rise, may cause the reaction mixture to solidify into a hard, immovable mass. This is particularly true if the dye base is compound (III). If the quaternization reaction is conducted as described the resulting quaternary salt will be a free-flowing solid in high yield and purity (greater than 90%) which may be used without further purification.

Although it is preferred to utilize essentially stoichiometric quantities of reactants in order to avoid formation of water-insoluble by-products and also to avoid excesses of certain toxic alkylating agents, such as dimethyl sulfate, it is within the scope of the invention to utilize up to about a 10% excess of the alkylating agent to insure complete reaction. Where analysis of the product indicates that there is present a slight excess of either the dye base or the alkylating agent, this can be corrected by the addition of the appropriate amount of either the alkylating agent or dye base and further reaction until the desired degree of salt formation is achieved.

Suitable methylating agents include dimethyl sulfate, methyl p-toluene sulfonate, methyl iodide, methyl bromide, methyl chloride, dimethyl oxalate, and the like. However, it will be apparent to those skilled in the art that other alkylating agents, such as benzyl chloride, 1-iodooctane, N-(2-bromoethyl) phthalimide, tributylphosphate, and the like, may also be used effectively, without departing from the scope of the invention.

Oftentimes it may be desirable to prepare the quaternary salt in the presence of a solid, inert diluent or "flux". The "flux" is sometimes used to improve mixing of the solid reaction mixture and to make it more free-flowing. Suitable diluents are sodium chloride, dextrine, boric acid, sodium sulfate, trisodium phosphate, and the like. When used the diluent is generally present in an amount of from about 25% to about 75% by weight of the product, although the amount used is not critical.

The process of the invention may be conducted particularly effectively by the use of certain precision blenders, such as a Patterson-Kelly liquid-solid blender or a Littleford-Lodige precision blender. The latter is an especially preferred type of reaction equipment. It will be understood, however, that the process of the invention is not limited to use with any particular equipment, there being many means available to effect mixing of solid reaction mixtures to achieve intimate contact thereof.

The following examples will further illustrate the process of the invention.

EXAMPLE 1

Preparation of 3-(2-Hydroxy-1-Naphthylazo)-1-Methyl Pyridinium Methyl Sulfate

A mixture of 50.25 pounds of sodium chloride and 37 pounds (67.5 moles) or 1-(3-pyridylazo)-2-naphthol was blended in a 4.6 ft.$^3$ Littleford-Lodige precision blender and 18.75 pounds (67.5 moles) of dimethyl sulfate added thereto over a period of about 60 minutes in nine portions. The temperature of the reaction was maintained at about 35° C and the mixture blended for about 1 hour after addition of the dimethyl sulfate was complete. The crude product weighed 100 pounds (95% yield) and contained less than 0.1% of the substrate base and less than 0.01% dimethyl sulfate.

EXAMPLE 2

Following the procedure of Example 1 except that the sodium chloride diluent was omitted, 38.6 pounds (70.5 moles) of 1-(3-pyridylazo)-2-naphthol was charged to the blender and blended for 15 minutes. Then 18.8 pounds (67.7 moles) of dimethyl sulfate was added, portion wise over a period of about 2 hours at 35°–45° C. Blending was then continued for 2 hours during which time the temperature returned to room temperature. The product weighed 55.5 pounds (96.6% yield) and contained less than 0.5% free base and less than 0.01% dimethyl sulfate.

EXAMPLE 3

Preparation of 3-(2-Hydroxy-1-naphthylazo)-1-methyl Pyridinium p-Toluenesulfonate A mixture of 50.3 pounds of sodium chloride and 3.7 pounds (6.75 moles) of 1-(3-pyridylazo)-2-naphthol is blended in a Patterson-Kelly liquid-solid blender and 2.89 pounds (7.05 moles) of methyl p-toluenesulfonate added thereto over a period of about 45 minutes. The temperature of the reaction is maintained at about 40°–50° C for an additional period of about one hour. The product is of acceptable purity.

EXAMPLE 4

Preparation of 2-(p-Dimethylaminophenylazo)-6-methoxy-3-Methyl-benzothiazolium p-Toluenesulfonate A mixture of 17.3 pounds (25.2 moles) of 2-(p-dimethylaminophenylazo)-6-methoxybenzothiazole and 51.6 pounds of dextrine were blended in a 4.6 ft. Littleford-Lodige precision blender, heated to about 80°–85° C, and 10.3 pounds (25.1 moles) of methyl p-toluene sulfonate added thereto portion wise over a period of about 10 minutes so that the temperature did not exceed about 90° C. The reaction mixture was then blended for an additional 30 minutes at 85°–90° C. The product was obtained in high yield and contained less than 1% of the dye base and less than 0.5% of methyl p-toluenesulfonate.

EXAMPLE 5

Preparation of {2-[p-(2-chloro-4-nitrophenylazo)-N-Ethylanilino] ethyl} Trimethylammonium Methyl Sulfate A mixture of 3.3 pounds (4.0 moles) of 1-{p-[2-dimethylaminoethyl)ethylamino]phenylazo}-2-chloro-4-nitrobenzene and 6.0 pounds of sodium chloride are mixed in a Patterson-Kelly liquid-solid blender. To the blend is then added in portions 1.68 pounds (4.1 moles) of methyl p-toluenesulfonate over a period of about 60 minutes in 10 portions, maintaining a temperature of about 40° to 50° C. The reaction mixture is blended for an additional 30 minutes to insure complete reaction. The product is of acceptable purity.

I claim:

1. A process for the preparation of quaternary ammonium salts of organic dye bases selected from the group consisting of 2-(p-dimethylaminophenylazo)-6-methoxy benzothiazole, 1-(3-pyridylazo)-2-naphthol and 1-{p-[2-dimethylaminoethyl)ethylamino]phenylazo}-2-chloro-4-nitrobenzene, which comprises intimately contacting said solid dye base with an essentially stoichiometric amount of an alkylating agent, at a temperature of from about 30° C. to about 90° C., said alkylating agent being added to said dye base gradually in a manner such that the reaction mixture is a free-flowing solid throughout the reaction.

2. The process of claim 1 wherein said alkylating agent is a methylating agent selected from dimethyl sulfate, methyl p-toluenesulfonate, methyl iodide, methyl bromide, methyl chloride, and dimethyl oxalate.

3. The process of claim 2 wherein said dye base is 2-(p-dimethylaminophenylazo)-6-methoxybenzothiazole.

4. The process of claim 2 wherein said dye base is 1-(3-pyridylazo)-2-naphthol.

5. The process of claim 2 wherein said dye base is 1-{p-[2-dimethylaminoethyl)ethylamino]phenylazo}-2-chloro-4-nitrobenzene.

6. The process of claim 1 wherein there is additionally present in said reaction mixture an inert solid diluent.

7. The process of claim 6 wherein said diluent is sodium chloride.

8. The process of claim 6 wherein said diluent is dextrine.

* * * * *